United States Patent
Nishijima (10) Patent No.: US 10,559,084 B2
(45) Date of Patent: Feb. 11, 2020

(54) REFLECTION DETERMINING APPARATUS

(71) Applicant: TOYOTA JIDOSHA KABUSHIKI KAISHA, Toyota-shi, Aichi-ken (JP)

(72) Inventor: Masakazu Nishijima, Ebina (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/117,082

(22) Filed: Aug. 30, 2018

(65) Prior Publication Data
US 2019/0080460 A1 Mar. 14, 2019

(30) Foreign Application Priority Data
Sep. 8, 2017 (JP) .................. 2017-172670

(51) Int. Cl.
| | |
|---|---|
| G06T 7/246 | (2017.01) |
| B60R 11/04 | (2006.01) |
| G06T 7/269 | (2017.01) |
| G06T 7/00 | (2017.01) |
| B60R 11/00 | (2006.01) |

(52) U.S. Cl.
CPC .............. *G06T 7/246* (2017.01); *B60R 11/04* (2013.01); *G06T 7/001* (2013.01); *G06T 7/269* (2017.01); *B60R 2011/0026* (2013.01); *G06T 2207/10016* (2013.01); *G06T 2207/30168* (2013.01); *G06T 2207/30252* (2013.01)

(58) Field of Classification Search
CPC ......... G06T 7/246; G06T 7/001; G06T 7/269; G06T 2207/30252; G06T 2207/30168; G06T 2207/10016; B60R 11/04; B60R 2011/0026

USPC .......................................................... 348/148
See application file for complete search history.

(56) References Cited

U.S. PATENT DOCUMENTS

| | | | | |
|---|---|---|---|---|
| 2014/0320682 | A1* | 10/2014 | Kuwabara | .............. H04N 5/357 |
| | | | | 348/208.6 |
| 2017/0305361 | A1* | 10/2017 | Okuda | ................ B60W 30/143 |
| 2019/0135197 | A1* | 5/2019 | Kanaya | ............... B60R 11/0229 |

FOREIGN PATENT DOCUMENTS

JP 2010-146284 A 7/2010

* cited by examiner

*Primary Examiner* — Allen C Wong
(74) *Attorney, Agent, or Firm* — Sughrue Mion, PLLC (57) ABSTRACT

A reflection determining apparatus is configured to determine reflection for a camera, wherein the camera is configured to photograph an external environment of a vehicle through a glass from an inside of the vehicle and the camera includes a reflection preventer configured to prevent reflection on the glass. The reflection determining apparatus is provided with: a calculator configured to calculate an optical flow of an area in which the reflection is not prevented in a photographed image of the camera; and a determinator configured to determine that there is the reflection in the photographed image of the camera if a duration in which a particular area is detected is greater than or equal to a predetermined time, wherein the particular area is defined by points with a value of the optical flow that is smaller than a predetermined threshold value.

4 Claims, 6 Drawing Sheets

FIG. 6

REFLECTION DETERMINING APPARATUS

CROSS-REFERENCE TO RELATED APPLICATIONS

This application is based upon and claims the benefit of priority of the prior Japanese Patent Application No. 2017-172670, filed on Sep. 8, 2017, the entire contents of which are incorporated herein by reference.

BACKGROUND

1. Technical Field

Embodiments of the present disclosure relate to a reflection determining apparatus configured to determine whether there is reflection on a glass with respect to a camera mounted on a vehicle, and an imaging apparatus provided with the reflection determining apparatus.

2. Description of the Related Art

For this type of apparatus, for example, there is known an apparatus configured to determine whether a dashboard or the like is reflected on a windshield or a front window of a vehicle, in an image photographed by an in-vehicle camera. For example, Japanese Patent Application Laid Open No. 2010-146284 (Patent Literature 1) discloses an apparatus that is provided with an in-vehicle camera as a two-lens or twin-lens camera, including a reference camera and a comparison camera, and that is configured to estimate a non-obstacle image, i.e., a reflected obstacle, included in a reference image, by using parallax data between a reference image photographed by the reference camera and a comparison image photographed by the comparison camera.

A technology/technique described in the Patent Literature 1, however, requires that the camera is the twin-lens camera as an essential condition. The technology/technique thus cannot be applied to a single-lens camera, which is technically problematic.

SUMMARY

In view of the aforementioned problems, it is therefore an object of embodiments of the present disclosure to provide a reflection determining apparatus configured to determine whether there is the reflection on the glass in the photographed image of the camera, which is mounted on the vehicle, and an imaging apparatus.

The above object of embodiments of the present disclosure can be achieved by a reflection determining apparatus for a camera, wherein the camera is configured to photograph an external environment of a vehicle through a glass from an inside of the vehicle and the camera includes a reflection preventer configured to prevent reflection on the glass, the reflection determining apparatus provided with: a calculator configured to calculate an optical flow of an area in which the reflection is not prevented by the reflection preventer, in a photographed image of the camera; and a determinator configured to determine that there is the reflection in the photographed image of the camera if a duration in which a particular area is detected is greater than or equal to a predetermined time, wherein the particular area is defined by points with a value of the optical flow that is smaller than a predetermined threshold value.

The above object of embodiments of the present disclosure can be achieved by an imaging apparatus provided with: a camera configured to photograph an external environment of a vehicle through a glass from an inside of the vehicle; a camera hood configured to prevent reflection on the glass in a partial area of a photographed image of the camera; and a reflection determining apparatus configured (i) to calculate an optical flow of an area in which the reflection is not prevented by the camera hood in the photographed image of the camera and (ii) to determine that there is the reflection in the photographed image of the camera if a duration in which a particular area is detected is greater than or equal to a predetermined time, wherein the particular area is defined by points with a value of the optical flow that is smaller than a predetermined threshold value.

DETAILED DESCRIPTION OF THE EMBODIMENTS

Hereinafter, a reflection determining apparatus and an imaging apparatus according to embodiments of the present disclosure will be explained with reference to the drawings.
<Configuration of Apparatus>

Figure 1:
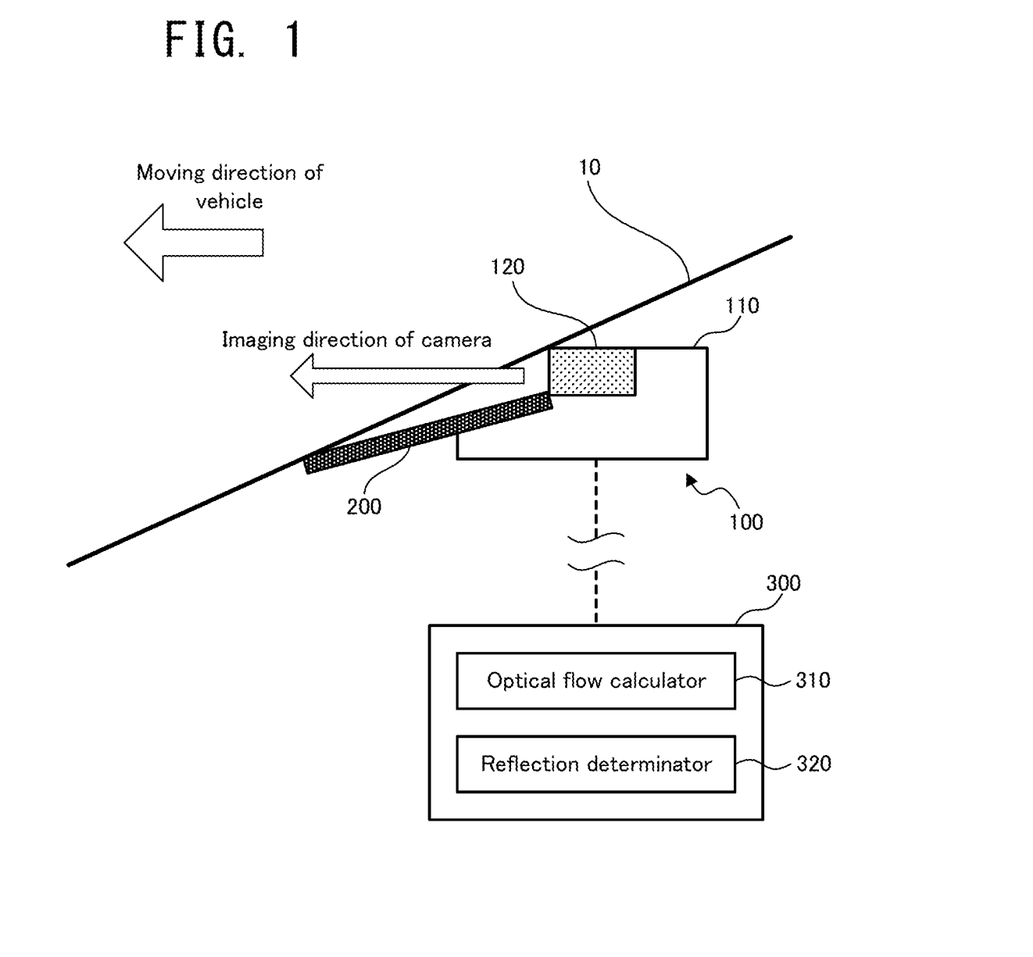
FIG. 1 is a side view illustrating a configuration of an imaging apparatus according to an embodiment.
Figure 2:
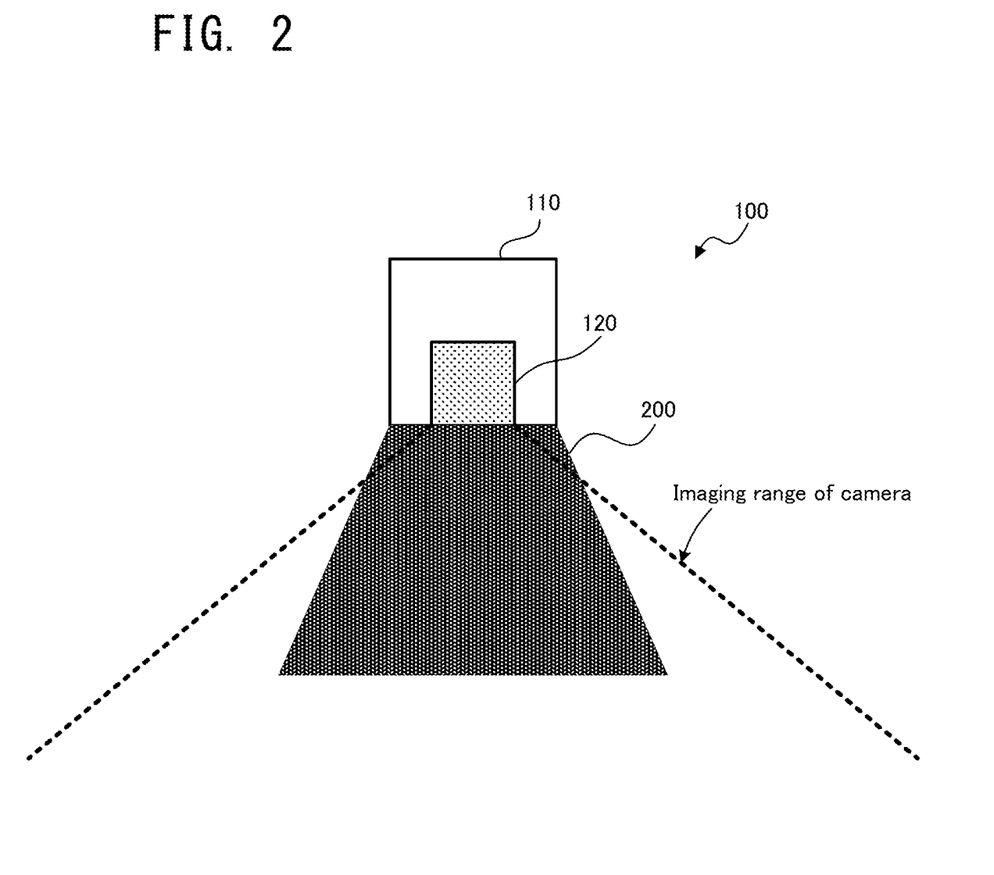
FIG. 2 is a top view illustrating a shape of a camera hood and an imaging range of a camera.

Firstly, a configuration of an imaging apparatus according to an embodiment will be explained with reference to FIG. 1 and FIG. 2. FIG. 1 is a side view illustrating the configuration of the imaging apparatus according to the embodiment. FIG. 2 is a top view illustrating a shape of a camera hood.

As illustrated in FIG. 1, the imaging apparatus according to the embodiment is configured to image or photograph an external environment of a vehicle, which is specifically a scene or conditions ahead of the vehicle, through a windshield or a front window 10 of the vehicle. An image photographed by the imaging apparatus may be used, for example, to detect an obstacle or the like.

The imaging apparatus according to the embodiment is provided with a camera 100, a camera hood 200, and a reflection determining apparatus 300. The camera 100 may include a camera main body 110 and a lens 120. The camera hood 200 may be mounted under or on a lower side of the lens 120 of the camera 100. The camera hood 200 is a specific example of the "reflection preventer" in Supplementary Notes described later, and is configured to prevent reflection from occurring in the photographed image by being located to block a space between an area included in an imaging range of the camera on the windshield 10 and a not-illustrated dashboard. The reflection determining apparatus 300 is configured, for example, as an electronic control unit (ECU) mounted on the vehicle, and is provided with an optical flow calculator 310 and a reflection determinator 320, as processing blocks logically realized therein. Each operation of the optical flow calculator 310 and the reflection determinator 320 will be explained in detail later.

As can be seen in FIG. 2, the camera hood 200 may not cover the entire imaging range of the camera 100, as viewed from directly above the vehicle. In other words, the imaging range of the camera 10 may include an area in which the reflection is prevented by the camera hood 200, but also may include an area in which the reflection is not prevented. Increasing the size of the camera hood 200 may provide a larger area in which the reflection is prevented by that much; however, the size that can cover the entire imaging range of the camera 100 may also possibly narrow a vision of an occupant of the vehicle. It is thus not preferable to excessively increase the size of the camera hood 200.

<Reflection in Photographed Image>

Figure 3:
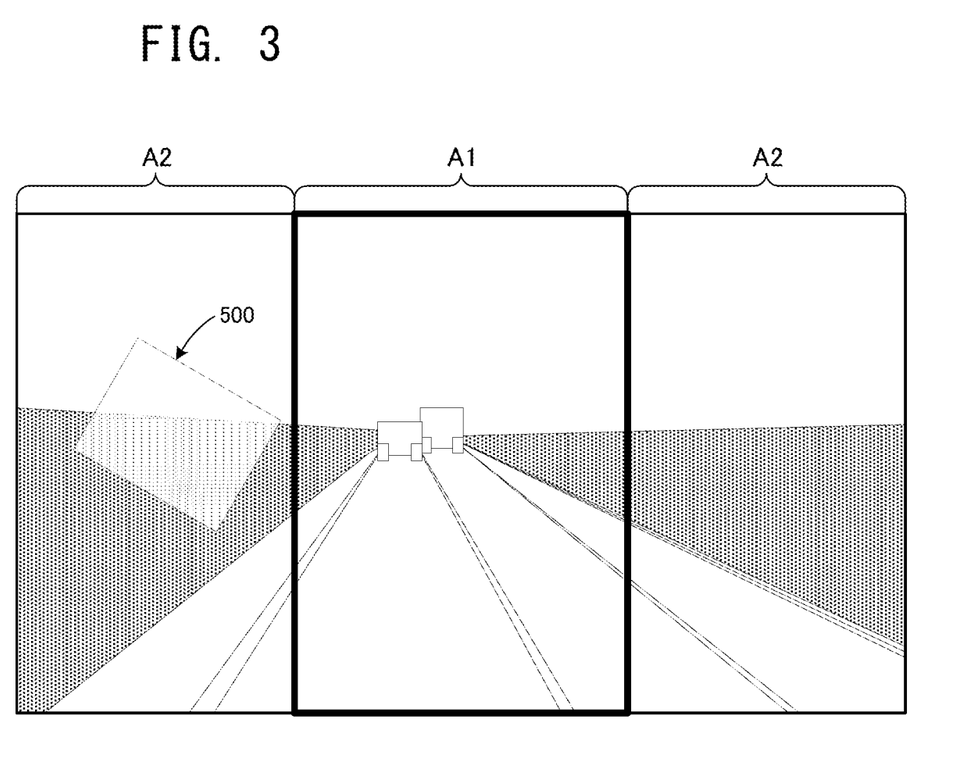
FIG. 3 is a plan view illustrating occurrence of reflection in an outer area in which the reflection is not prevented.

Next, the reflection on a glass or the windshield that occurs in the photographed image will be specifically explained with reference to FIG. 3. FIG. 3 is a plan view illustrating the occurrence of the reflection in an outer area in which the reflection is not prevented by the camera hood.

As illustrated in FIG. 3, the photographed image of the camera 100 has an inner area A1 corresponding to the area in which the reflection is prevented by the camera hood 200, and an outer area A2 corresponding to the area in which the reflection is not prevented, i.e., an area in which the camera hood 200 is not provided. The inner area A1 is a specific example of the "central area" in Supplementary Notes described later. In the outer area A2, if there is an object placed on the dashboard of the vehicle or the like, the object is reflected on the windshield 10, and the photographed image may include a reflected object 500 as illustrated in FIG. 3.

The reflected object 500 possibly adversely affects various controls using the photographed image of the camera 100. It is thus not preferable to maintain a situation in which there is the reflected object 500 in the photographed image. The reflection determining apparatus 300 according to the embodiment is configured to perform a reflection determination operation using an optical flow, in order to determine the occurrence of the reflection. Hereinafter, a principle of the reflection determination operation will be simply explained.

The optical flow may indicate a movement vector of the object in the photographed image, and may be calculated by comparing a past photographed image and a present photographed image. Here, as is clear from FIG. 3, the outer area A2 in which the reflection is not prevented shows an object located ahead of or on the side of the vehicle. The object located ahead of or on the side of the vehicle may significantly move in accordance with running of the vehicle. Thus, a value of the optical flow (or a flow value) may be calculated as a relatively large value during the running of the vehicle. On the other hand, the reflected object 500 rarely moves even when the vehicle runs. Thus, a flow value of an area corresponding to the reflected object 500 may be extremely small. As described above, it is possible to determine the occurrence of the reflection by using the magnitude of the optical flow.

The inner area A1 in which the reflection is prevented shows an object located ahead of the vehicle. The object located ahead of the vehicle may not significantly move in some cases, even when the vehicle runs. Thus, the value of the optical flow is possibly relatively small, and there may be no clear difference from the flow value of the reflected object 500. On the imaging apparatus according to the embodiment, however, the reflection is prevented by the camera hood 200, for the inner area A1 located near the center of the photographed image. Therefore, the reflection cannot occur in the inner area A1. It is thus sufficient to perform the reflection determination only in the outer area A1 in which the reflection is not prevented, and the aforementioned detrimental effect does not occur.

<Reflection Determination Operation>

Figure 4:
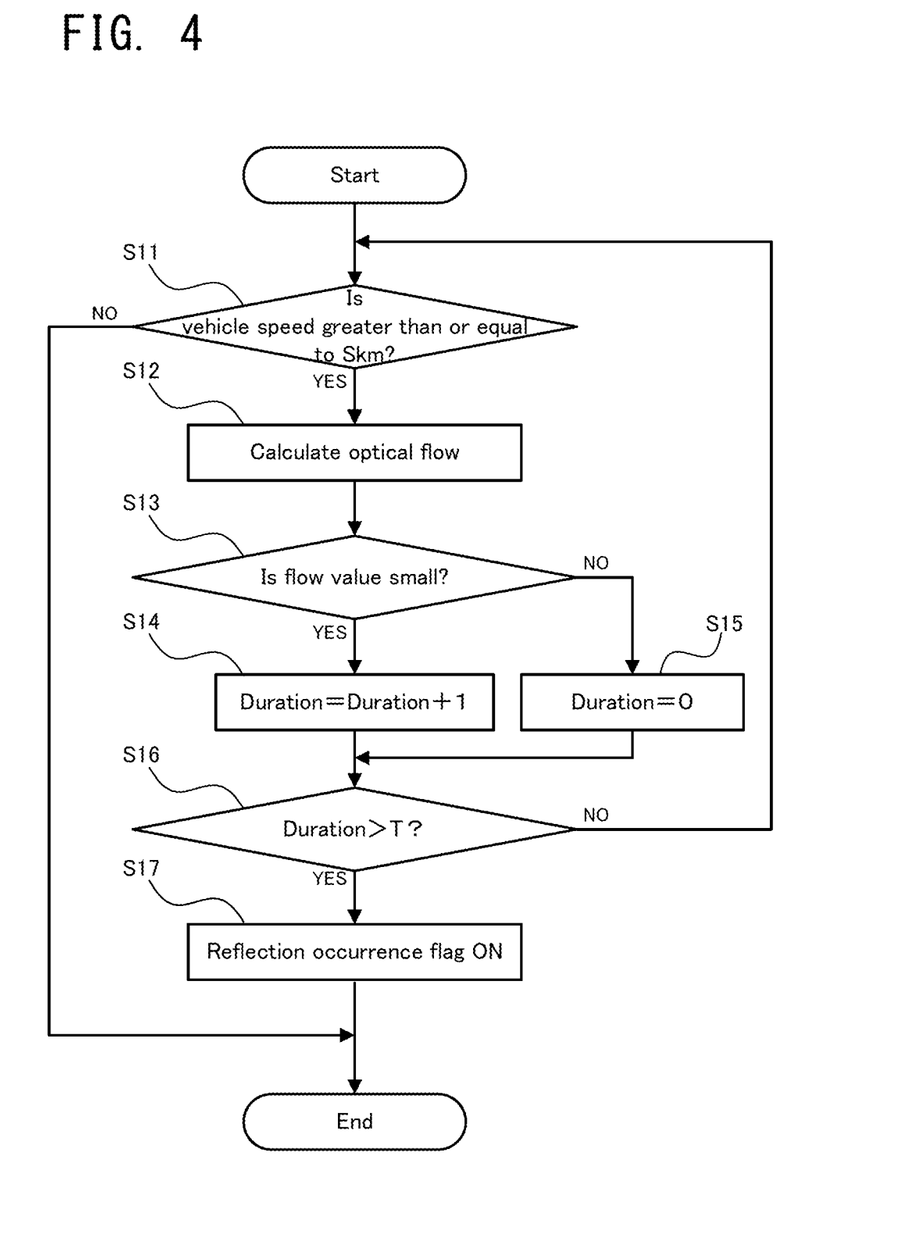
FIG. 4 is a flow chart illustrating a flow of a reflection determination operation.

Next, the reflection determination operation performed by the reflection determining apparatus 300 according to the embodiment will be specifically explained with reference to FIG. 4. FIG. 4 is a flow chart illustrating a flow of the reflection determination operation.

As illustrated in FIG. 4, in operation of the reflection determining apparatus 300 according to the embodiment, it is determined whether or not a vehicle speed is greater than or equal to S km (step S11). The speed S is a specific example of the "predetermined speed" in Supplementary Notes described later, and may be set as a speed that allows a clear difference to appear between the flow value of an object located outside the vehicle and the flow value of the reflected object 500. If the vehicle speed is not greater than or equal to S km (the step S11: NO), the object located outside the vehicle has a low moving speed, and there is a possibility that the reflection determination cannot be performed even if the optical flow is calculated. Thus, the subsequent steps are omitted. In this case, after a lapse of a predetermined period, the reflection determination operation may be started again from the start.

If the vehicle speed is greater than or equal to S km (the step S11: YES), the optical flow calculator 310 (refer to FIG. 1) calculates the optical flow for each point of the photographed image (step S12). As explained above, the reflection cannot occur in the inner area A1, and the optical flow is thus calculated only in the outer area A1 in which the reflection is not prevented. The optical flow may be calculated in pixel units, or in units of pixel groups, each of which includes a plurality of pixels. The flow value calculated by the optical flow calculator may be outputted to the reflection determinator 320.

Figure 5:
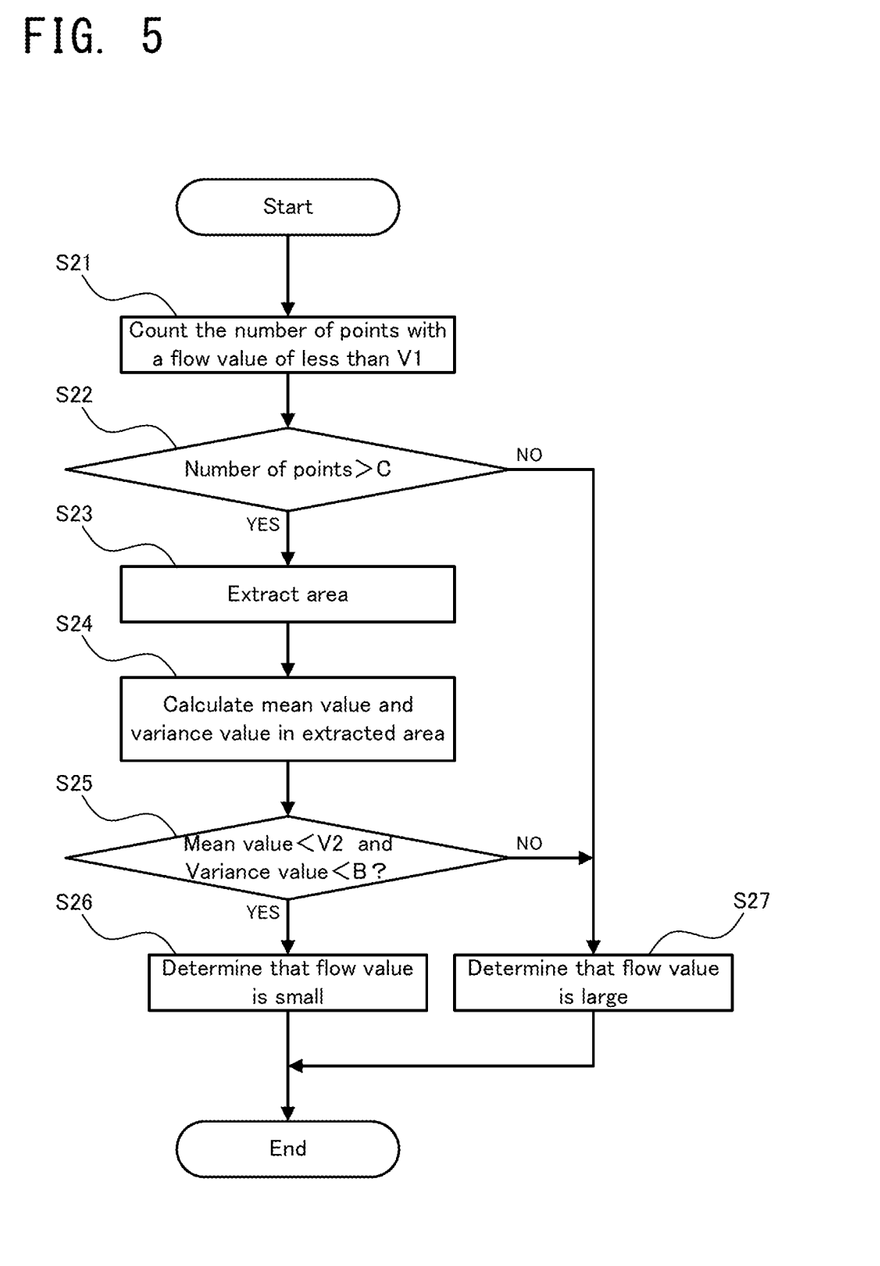
FIG. 5 is a flow chart illustrating a flow of an optical flow determination operation.
Figure 6:
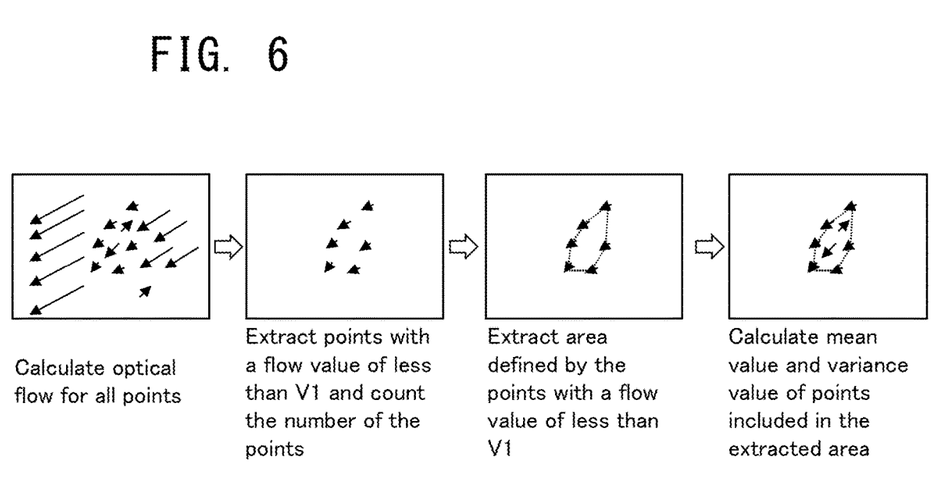
FIG. 6 is a conceptual scheme sequentially illustrating processes of the optical flow determination operation.

The reflection determinator 320 determines whether or not the calculated value of the optical flow is small enough to determine that there is the reflection (step S13). Hereinafter, the optical flow determination operation in the step S13 will be explained in detail with reference to FIG. 5 and FIG. 6. FIG. 5 is a flow chart illustrating a flow of the optical flow determination operation. FIG. 6 is a conceptual scheme sequentially illustrating processes of the optical flow determination operation.

As illustrated in FIG. 5 and FIG. 6, in the optical flow determination operation, firstly, points with a flow value of less than V1 are extracted from all the points for which the optical flow is calculated, and the number of the points is counted (step S21). Here, V1 is a specific example of the "predetermined threshold value" in Supplementary Notes described later, and is a threshold value for determining whether or not the flow value is small enough to determine that an area including the points that are targeted for the determination is likely the reflected object 500.

Then, it is determined whether or not the counted number of the points is greater than C (step S22). Here, C is set as a threshold value for determining whether or not the number of the points with a flow value of less than V1 is high enough to form an area indicating the presence of an object. If the counted number of the points is not greater than C (the step S22: NO), it can be determined that there is no area that can be the reflected object 500, which is, for example, a situation in which the flow value is partially erroneously calculated to be larger due to measurement noise or the like. Thus, a determination result that is "the flow value is large" is outputted (step S27), and a series of operation processes is ended.

On the other hand, if the counted number of the points is greater than C (the step S22: YES), it can be determined that points with a small flow value are detected in a group, and that there is an area that is likely the reflected object 500. Thus, in this case, a process of extracting an area defined by the points with a flow value of less than V1 is performed (step S23). As illustrated in FIG. 6, in the area extracting process, the area may be extracted by connecting the points with a flow value of less than V1. The extracted area is a specific example of the "particular area" in Supplementary Notes described later.

After the area is extracted, a mean value and a variance value of the flow values of all the points included in the area are calculated (step S24). If a plurality of areas are determined in the step S23, steps after the step S24 may be performed for each of the areas.

Then, it is determined whether or not the following conditions are satisfied; namely, whether or not the mean value is less than V2, and whether or not the variance value is less than B (step S25). If the extracted area is the reflected object 500, the flow values for the points included in the area should be approximately equal to each other. It can be considered that the mean value of the flow values is low to some extent and that the variance value indicating variations is small. It is thus possible to determine a probability that the extracted area is the reflected object 500 by determining whether or not the aforementioned condition is satisfied.

Specifically, a threshold value V2 may be set to be slightly greater than V1, which is used in the step S21, and may be used to determine whether or not the flow values of the points located in the area are approximately V1. If the mean value is greater than V2, it can be estimated that there is a point with a flow value of significantly greater than V1 in the area, or that there are many points with a flow value of slightly greater than V1 in the area. It is thus possible to determine that the area is less likely the reflected object 500. On the other hand, if the mean value is less than V2, it can be estimated that there is no point with a flow value of significantly greater than V1 in the area, and even if there are points with a flow value of slightly greater than V1, they are not many. It is thus possible to determine that the area is likely the reflected object 500.

Moreover, a threshold value B may be used to determine whether the flow values of the points located in the area are included in a certain degree of range. If the threshold value B is large, there is a large variation in the points located in the area. It can be thus determined that the area is less likely the reflected object 500. On the other hand, if the threshold value B is small, there is a small variation in the points located in the area. It can be thus determined that the area is less likely the reflected object 500.

As a result, if the conditions, which are that the mean value is less than V2 and that the variance value is less than B, are satisfied, a determination result that is "the flow value is small" is outputted (step S26). On the other hand, if the conditions, which are that the mean value is less than V2 and that the variance value is less than B, are not satisfied, the determination result that is "the flow value is small" is outputted (the step S27).

Back in FIG. 4, if it is determined that the flow value is small by the aforementioned optical flow determination operation (the step S13: YES), the reflection determinator 320 increments a duration (whose initial value=0) in which an area with a small value of the optical flow is detected (step S14). On the other hand, if it is determined that the flow value is not small (the step S13: NO), the reflection determinator 320 initializes the duration in which the area with a small value of the optical flow is detected (step S15).

The reflection determinator 320 then determines whether or not the duration at a present time point is greater than T (step S16). Here, T is a specific example of the "predetermined time" in Supplementary Notes described later, and is set in advance as a threshold value for avoiding erroneous determination, i.e., a situation in which it is determined that there is the reflection even though the reflection does not occur. By determining whether or not the duration is greater than T, it is possible to prevent the erroneous determination that there is the reflection when a small optical flow is momentarily calculated. If the reflection actually occurs, the optical flow is kept small unless the reflection is eliminated. It is thus possible to more accurately determine the occurrence of the reflection, by determining whether or not the duration in which the area with a small value of the optical flow is detected is greater than or equal to the threshold value T.

If it is determined that the duration is not greater than T (the step S16: NO), the process is repeated from the step S11. By repeating the process in this manner, the duration gradually increases while the detection of the area with a small value of the optical flow is continued, and in the end, the duration becomes greater than the threshold value T. On the other hand, if the detection of the area with a small value of the optical flow is stopped, the duration is initialized to zero at that time point, and the duration does not exceed the threshold value T. If it is determined that the duration is greater than T (the step S16: YES), the reflection determinator 320 determines that there is the reflection in the photographed image, and turns on a reflection occurrence flag (step S17). If the reflection occurrence flag is ON, for example, the occupant of the vehicle may be alerted by audio or images to eliminate the reflection.

As explained above, according to the imaging apparatus in the embodiment, it is possible to determine the occurrence of the reflection by using the optical flow of the photographed image. Moreover, for an area in which the occurrence of the reflection is hardly determined by using the optical flow (which is specifically the inner area A1 of the photographed image in which the object located outside the vehicle has a low moving speed), the reflection is prevented by the camera hood 200. Therefore, the reflection determination operation may be performed only in an area in which the occurrence of the reflection is easily determined by using the optical flow (which is specifically the outer area A2 of the photographed image in which the object located outside the vehicle has a high moving speed), and the occurrence of the reflection can be extremely accurately determined.

<Supplementary Notes>

Various aspects of embodiments of the present disclosure derived from the embodiment explained above will be explained hereinafter.

(Supplementary Note 1)

A reflection determining apparatus described in Supplementary Note 1 is a reflection determining apparatus for a camera, wherein the camera is configured to photograph an external environment of a vehicle through a glass from an inside of the vehicle and the camera includes a reflection preventer configured to prevent reflection on the glass, the reflection determining apparatus provided with: a calculator configured to calculate an optical flow of an area in which the reflection is not prevented by the reflection preventer, in a photographed image of the camera; and a determinator configured to determine that there is the reflection in the photographed image of the camera if a duration in which a particular area is detected is greater than or equal to a predetermined time, wherein the particular area is defined by points with a value of the optical flow that is smaller than a predetermined threshold value.

According to the reflection determining apparatus described in Supplementary Note 1, the camera includes the reflection preventer, and the reflection on the glass is thus prevented in a partial area of the photographed image. On the other hand, there is also the area in which the reflection is not prevented by the reflection preventer, i.e., an area in which there can be the reflection.

In operation of the reflection determining apparatus, the optical flow of the area in which the reflection is not prevented may be firstly calculated. It is determined that there is the reflection in the photographed image of the camera if the duration in which the particular area is detected is greater than or equal to the predetermined time, wherein the particular area is defined by the points with the value of the optical flow that is smaller than the predetermined threshold value (which are specifically representative points of small pixel groups or pixels). The "predetermined threshold value" may be a threshold value for determining whether or not the optical flow is small enough to determine that an object in the photographed image rarely moves.

In the photographed image, an object located outside the vehicle may significantly move at a relatively high speed in accordance with running of the vehicle. Thus, the optical flow of an area in which the object located outside the vehicle is reflected may be large. On the other hand, the photographed object rarely moves in the area in which there is the reflection, which is in other words an area in which an object located inside the vehicle is reflected. Thus, the optical flow may be extremely small. It is thus possible to determine that the particular area, which is defined by the points with the value of the optical flow that is smaller than the threshold value, is likely the area in which there is the reflection.

If the particular area, which is defined by the points with the value of the optical flow that is smaller than the threshold value, is immediately determined to be the reflection, there is a possibility that it is erroneously determined that there is the reflection even in an area in which the optical flow is momentarily small. Thus, if the duration in which the particular area is detected is greater than or equal to the predetermined time, it is determined that there is the reflection in the photographed image. The "predetermined time" may be a threshold value for determining whether or not the duration in which the particular area is detected is long enough to determine that the reflection likely occurs.

(Supplementary Note 2)

In one aspect of the reflection determining apparatus described in Supplementary Note 2, the calculator is configured to calculate the optical flow if a speed of the vehicle is greater than or equal to a predetermined speed.

According to this aspect, if the speed of the vehicle is less than the predetermined speed, the optical flow may not be calculated. In other words, it is not determined whether or not there is the reflection. If the vehicle has a relatively low speed, the object located outside the vehicle as viewed from the camera also has a low moving speed. Thus, even in the area in which the object located outside the vehicle is photographed, there is a possibility that the area is detected as the particular area with a small optical flow. The "predetermined speed" may be set as a speed that is high enough to cause a significant difference between the optical flow of the object located outside the vehicle and the optical flow of the object reflected on the glass. It is possible to prevent the erroneous determination of the reflection by calculating the optical flow if the speed of the vehicle is greater than or equal to the predetermined speed.

(Supplementary Note 3)

In another aspect of the reflection determining apparatus described in Supplementary Note 3, the camera is configured to photograph the external environment that is ahead of or behind the vehicle, and the reflection preventer is configured to prevent the reflection in a central area of the photographed image of the camera.

According to this aspect, the reflection preventer is configured to prevent the reflection in the central area of the photographed image, and is configured not to prevent the reflection in an area other than the central area of the photographed image. The "central area" here indicates an area in a central part of the photographed image as viewed in a horizontal direction. Thus, the "area other than the central area" means an area near left and right edges of the photographed image.

When the vehicle runs, the object located outside the vehicle has a lower moving speed with approaching the center in the image obtained by photographing the external environment ahead of or behind the vehicle. Thus, the optical flow is relatively small even in the area in which the object located outside the vehicle is reflected. It is thus hard in the central area to determine the reflection by using the optical flow if there is the reflection. Therefore, in the first place, the reflection is prevented by the reflection preventer in the central area so that the reflection does not occur.

On the other hand, the object located outside the vehicle has a higher moving speed with approaching the left and right edges in the image obtained by photographing the external environment ahead of or behind the vehicle. Thus, the optical flow is relatively large in the area in which the object located outside the vehicle is reflected. It is thus easy in the area other than the central area of the photographed image to determine the reflection by using the optical flow. Therefore, the reflection can be easily determined even if the reflection is not prevented by the reflection preventer.

It is preferable that the reflection preventer is configured to prevent the reflection in as many areas as possible on the photographed image; however, in terms of the configuration, it is hard to prevent the reflection in all the areas. For example, if a camera hood or the like is used as the reflection preventer, increasing the size of the camera hood may provide a larger area in which the reflection is prevented; however, that may also narrow a vision of an occupant of the vehicle. It is thus hard to endlessly increase the size of the camera hood. Thus, the configuration for preventing the reflection in the central area described above may exhibit an extremely beneficial effect in practice.

(Supplementary Note 4)

An imaging apparatus described in Supplementary Note 4 is provided with: a camera configured to photograph an external environment of a vehicle through a glass from an inside of the vehicle; a camera hood configured to prevent reflection on the glass in a partial area of a photographed image of the camera; and a reflection determining apparatus configured (i) to calculate an optical flow of an area in which the reflection is not prevented by the camera hood in the photographed image of the camera and (ii) to determine that there is the reflection in the photographed image of the camera if a duration in which a particular area is detected is greater than or equal to a predetermined time, wherein the particular area is defined by points with a value of the optical flow that is smaller than a predetermined threshold value.

According to the imaging apparatus described in Supplementary Note 4, the aforementioned reflection determining apparatus is provided. It is thus possible to determine the occurrence of the reflection by determining whether or not the duration in which the particular area, which is defined by the points with the value of the optical flow that is smaller than the predetermined threshold value, is detected is greater than or equal to the predetermined time.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A reflection determining apparatus for a camera, wherein the camera is configured to photograph an external environment of a vehicle through a glass from an inside of the vehicle and the camera includes a reflection preventer configured to prevent reflection on the glass, said reflection determining apparatus comprising:
    a calculator configured to calculate an optical flow of an area in which the reflection is not prevented by the reflection preventer, in a photographed image of the camera; and
    a determinator configured to determine that there is the reflection in the photographed image of the camera if a duration in which a particular area is detected is greater than or equal to a predetermined time, wherein the particular area is defined by points with a value of the optical flow that is smaller than a predetermined threshold value.

2. The reflection determining apparatus according to claim 1, wherein said calculator is configured to calculate the optical flow if a speed of the vehicle is greater than or equal to a predetermined speed.

3. The reflection determining apparatus according to claim 1, wherein
    the camera is configured to photograph the external environment that is ahead of or behind the vehicle, and
    the reflection preventer is configured to prevent the reflection in a central area of the photographed image of the camera.

4. An imaging apparatus comprising:
    a camera configured to photograph an external environment of a vehicle through a glass from an inside of the vehicle;
    a camera hood configured to prevent reflection on the glass in a partial area of a photographed image of the camera; and
    a reflection determining apparatus configured (i) to calculate an optical flow of an area in which the reflection is not prevented by the camera hood in the photographed image of the camera and (ii) to determine that there is the reflection in the photographed image of the camera if a duration in which a particular area is detected is greater than or equal to a predetermined time, wherein the particular area is defined by points with a value of the optical flow that is smaller than a predetermined threshold value.

* * * * *